Aug. 28, 1951  P. W. HOFF  2,565,608
BRAILLE WRITING DEVICE

Filed Feb. 8, 1946  2 Sheets-Sheet 1

INVENTOR
PAUL W. HOFF
BY [signature]
ATTORNEY

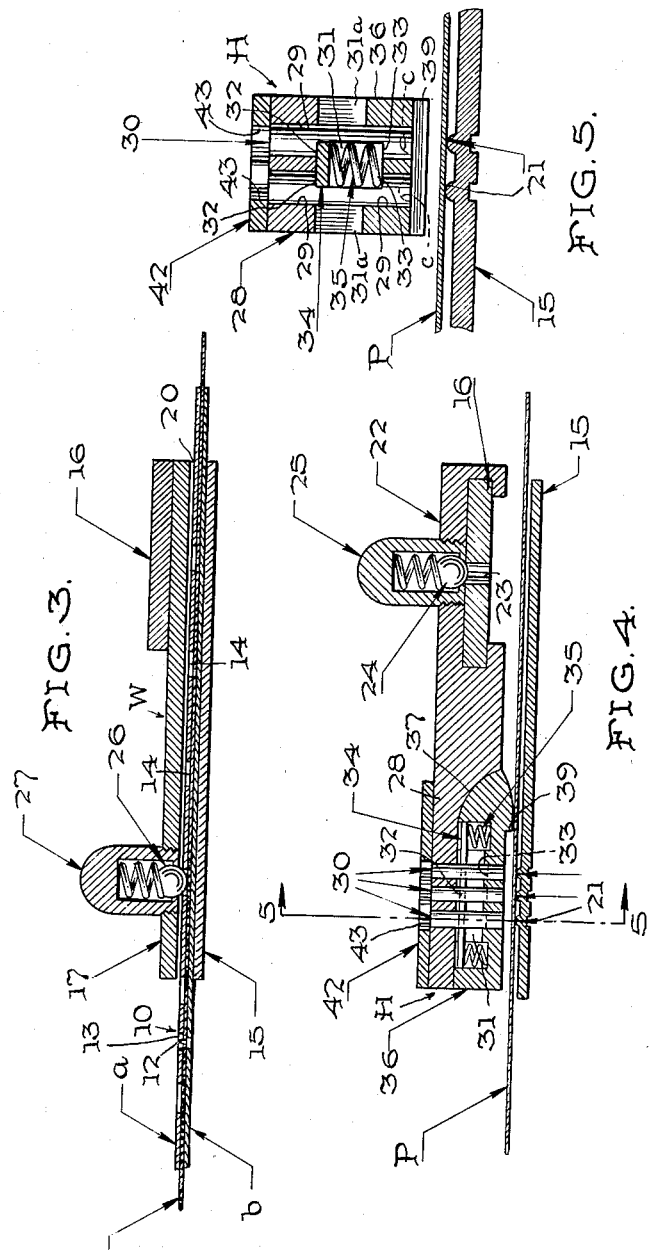

Patented Aug. 28, 1951

2,565,608

UNITED STATES PATENT OFFICE 2,565,608

BRAILLE WRITING DEVICE

Paul W. Hoff, Fairbault, Minn.

Application February 8, 1946, Serial No. 646,225

9 Claims. (Cl. 101—3)

The present invention relates to improvements in writing devices for the use of the blind and, more particularly, to such devices for creating or producing Braille characters.

In devices heretofore used by the blind for writing wherein there is formed a Braille symbol, such symbols, which are in the form of embossed dots, are usually created on the reverse side of the paper and are written or produced by said devices from right to left. This makes it impossible for the user to read the character just produced without withdrawing the paper from the slate or similar writing device. Moreover, in Braille writing devices, which have been previously proposed, for forming raised or embossed characters on the obverse side of a sheet and readable from left to right (after the usual and customary manner of reading), they are of such construction or arrangement that the user can not read, by touch, the character just produced, without movement of the paper sheet or of the character producing means to position beyond or out-of-line with respect to the relative position such parts should assume to produce the next characters or symbols in normal writing, thus confusing the user and consuming a great deal of time to readjust said parts to their proper relative positions for formation of the next characters.

Furthermore, so far as is known, none of the prior art devices permit working mathematical problems in Braille. The prior art devices, as above referred to, tend to complicate the process with the result that the mathematical problem becomes so involved as to render any type of Braille slate virtually useless as far as mathematical instruction is concerned. By means of the present invention, however, simplified mathematical instruction is made possible and because of its particular design, the user is able to read the mathematical equation symbol just created before proceeding to create or form the next symbol.

It is, therefore, an important object of the present invention to provide a device for the use of the blind in writing which permits the reading of the Braille symbol just written after the character-producing means has been moved to proper position to write the next character and before proceeding to write the next one.

Another object of the invention is to provide a Braille writing device, as just mentioned, wherein the symbols or impressions are formed on the front side of the paper thus rendering it possible to read and write in the normal manner, that is, from left to right, but it is also capable of operation to permit writing or reading from right to left or up and down.

A further object of the invention is to provide a device of the above character wherein the method of creating embossed dots forming the various Braille symbols is accomplished through the use of an arranged group of plungers having cupped ends which fit over or receive, respectively, one of a group of similarly arranged raised dots located directly beneath the plungers, each group of dots being properly spaced from each other as is the custom of spacing to form successive Braille characters or symbols.

Moreover, it is an object of the invention to provide a holder-guide means for the paper sheet which is in slidable engagement with the Braille writing device and cooperates therewith so as to enable the operator to move the paper sheet relative to the Braille writing mechanism (in opposite directions) to obtain proper spacing of each line of symbols and to enable the operator to relocate to any line with accuracy and no difficulty, said paper sheet holder-guide means being readily removable from and insertable into cooperative relation with the Braille writing means.

A still further object of the invention is to provide a Braille writing device wherein the paper can be repeatedly inserted for proper alignment, regardless of the number of times it is necessary to take the paper in and out during the use of the device, to re-align for changing or correcting a symbol or resume writing.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings:

Figure 2 is a transverse sectional view taken substantially on line 2—2 of Figure 1;

Figure 3 is a detail sectional view taken substantially on line 3—3 of Figure 1;

Figure 4 is a sectional view through the embossing head and is taken substantially on line 4—4 of Figure 1;

Figure 5 is a sectional view through the embossing head and is taken substantially on line 5—5 of Figure 4.

Figure 1:
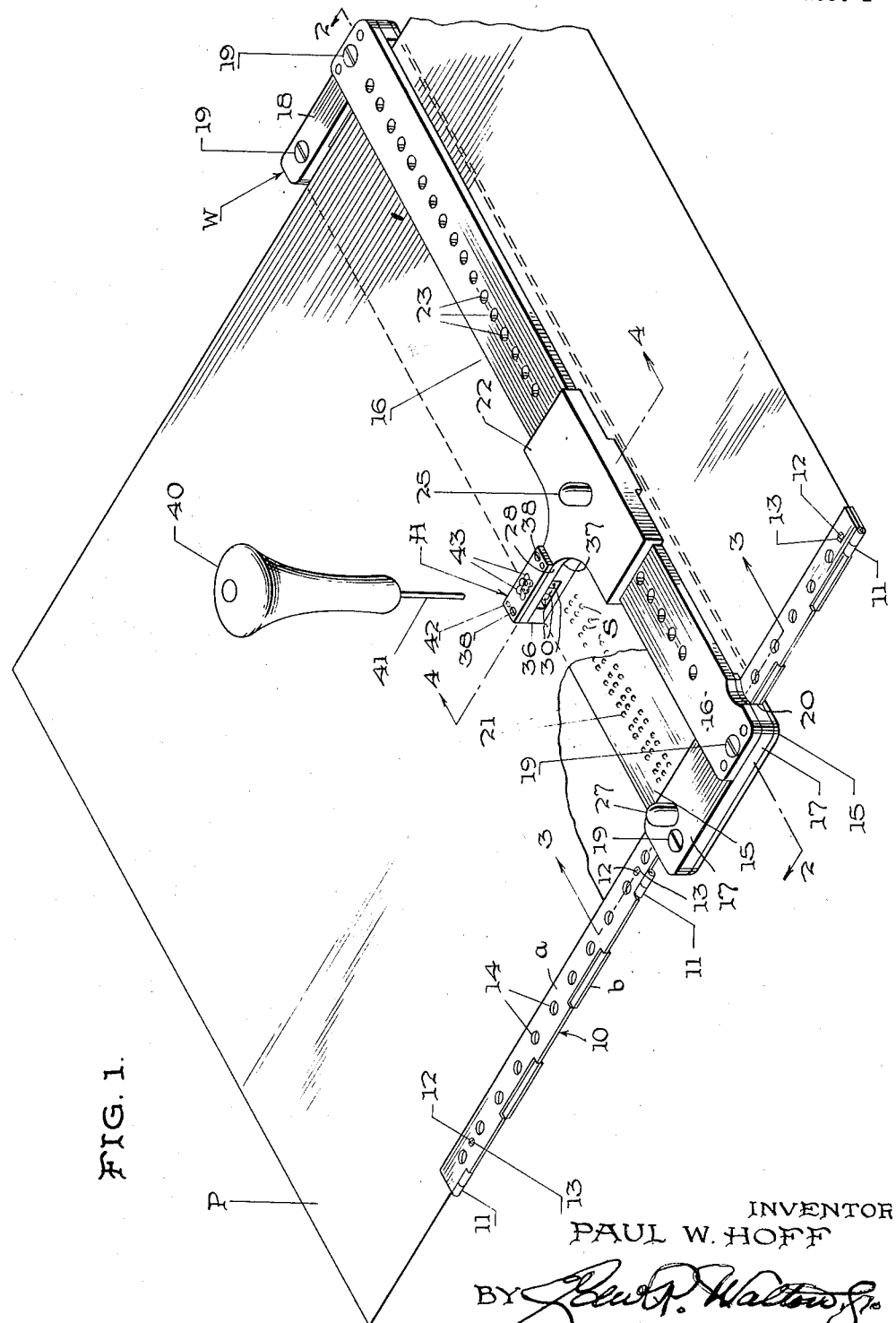
Figure 1 is a perspective view of a writing device for the blind embodying the features of the present invention.

In its preferred form, the present invention includes a holder-guide for supporting the marginal side edge (preferably the left edge) of a sheet of writing paper, on which the Braille symbols are to be embossed, and a writing device into which the holder-guide is insertable and removable. The writing device is dimensioned to a size as will extend transversely across any sheet of writing paper that it is customary to use and the holder-guide is slidably mounted in the writing device to be moved tranversely thereof. The writing device includes a supporting bar which is spaced above the obverse side of the paper and a base plate spaced below the reverse side of said paper, both extending transversely of the paper sheet and the surface of said base plate opposite the paper sheet being formed with spaced groups of embossing projections arranged to extend transversely of the paper sheet. A character-forming head, to be hereinafter termed an embossing head, is carried on a carriage slidable transversely of the paper on said bar and contains plunger elements which overlie the embossing projections, the bar and head having cooperating means for arresting the slidable movement of the latter so as to successively align the head with each successive group of character-forming projections on said base plate as the head is slid progressively in either direction. As in normal writing, this head is movable from left to right in the formation of Braille symbols or characters and the paper holding guide is slidable on and relative to the writing device W for proper line spacing in the direction of the length of the paper holding guide, there also being similar cooperating means on the paper holding guide and said writing device to arrest the former to accomplish said line spacing. The embossing head carrying the plunger-elements is small and compact and designed so that when moved one space to the right, after formation of the Braille symbol, the symbol just formed will be uncovered thereby enabling the user to read, by touch, each Braille symbol immediately after it is formed without the need or necessity to further move the embossing head or the paper sheet.

Referring to the drawings for a more detailed description thereof, and for other specific novel features of the invention, a sheet of paper P on which Braille characters are to be formed has one of its side marginal edges (preferably the left edge) supported by the holder-guide 10. The holder-guide 10 comprises two elongated narrow strips a and b of relatively rigid material which are united along one of their longitudinal edges by means of hinges 11 which permits the strips to be opened or separated with respect to one another at least 90° or thereabout. Thus, when so opened, the said side marginal edge of the paper sheet is inserted to abut against the hinged portions 11 and the strips are then moved to the closed position shown in Fig. 1 of the drawings, to clamp said edge of the sheet therebetween.

To further aid in retaining the paper sheet in position, one of the strips is provided with a series of pins 12 which are adapted to penetrate the paper. The other of said strips is formed with a series of openings 13 in alignment with the pins 12 for receiving said pins. Also one of the strips of said holder-guide is provided with a series of equi-spaced openings 14 for a purpose to be hereinafter explained.

With the sheet of paper P so supported, the holder-guide 10 will be inserted into the writing device, generally designated by the reference character W, and is slidable transversely relative to the latter.

The writing device W includes an elongated base plate 15 of a length somewhat in excess of the width (from left to right) of the paper sheet to use with the device and a carriage supporting bar 16, of considerably less width than that of the plate 15, arranged longitudinally along and substantially parallel with the bottom marginal edge portion of the plate 15 and spaced therefrom, said bar 16 being, for practical purposes, substantially coextensive with the plate 15. The spacing between the plate 15 and bar 16 may be accomplished in any preferred manner, but is here shown as provided by two spacing blocks 17 and 18, one being positioned between opposite ends, respectively, of the bar and plate and all being secured together by screws 19. One of said blocks, here shown as 17, is grooved in a direction transversely of the plate 15 and facing the latter, as indicated at 20, to provide a guide-way (together with the plate 15) through which the holder-guide 10 may extend with a sliding fit. When the holder-guide 10 carrying a sheet of paper P is inserted in the guide-way 20, the plate 15 is spaced a slight distance below the sheet of paper. The upper face of the base plate 15 along its upper marginal edge portion, which lies a substantial distance from the bar 16, is provided, longitudinally of said edge, with a plurality of spaced groups of convexed embossing projections 21 arranged in a row transversely (left to right) of the paper sheet P, said projections being substantially in contact with the lower face of the paper sheet as more particularly shown in Figure 2 of the drawings.

The embossing head, which is generally designated by the reference character H, projects from and is supported by a carriage 22 slidably mounted and supported on the bar 16 for movement transversely of the sheet of paper P. The carriage 22 is a block or plate formed to straddle and fittedly embrace, with a sliding movement, the bar (see Fig. 4) so as to remain thereon and has wide bearing areas on the bar to assure accurate positioning of the embossing head H. A series of equally spaced openings 23 are formed in the bar 16 and which are adapted to be engaged by the spring-pressed ball 24 extending through an opening in the carriage 22 and carried by the thimble 25 threaded in said end and projecting above said carriage. As the carriage 22 is slidably movable from left to right, and conversely, as viewed in Figure 1, there are as many openings 23 in the bar 16 as there are groups of symbol forming projections 21 on the plate 15, each opening 23 being arranged to align the embossing head H for proper cooperation with a group of projections 21. Thus, the spring-pressed ball 24 yieldably cooperates with the openings 23 to determine the amount of movement of the head H, and to arrest said movement, from one group of projection 21 to the next succeeding group.

In the use of the device, exerting ordinary manual pressure on the carriage 22 will effect disengagement of the ball 24 from one of the openings 23 permitting movement thereof (and of the embossing head) until said ball is brought to rest in the next adjacent opening 23, thereby the engagement of the ball with an opening 23 creates a step by step clicking movement of the embossing head 29 which is audible or sensitive to the user's touch. Also, a similar spring-pressed ball 26 extends through an opening in the spacing block 17 and is carried in the thimble 27 (similarly as the thimble 25) threading in said opening for engagement with the spaced openings 14 in the paper holding guide 10, which openings 1 are arranged so as to effect and determine proper line spacing on the paper sheet P as said holder-guide is moved in its guide-way 20. In other words, the space between two of the openings 14 determines the line spacing on the sheet of paper P. The clicking of the ball 26 into and out of the openings 14 will also be audible to the user or sensitive to his touch.

Embossing head H extends from carriage 22 laterally with respect to the bar 16 so as to overlie any selected one of the groups of character-forming projections 21 on the plate 15. It will be observed that the portion of the carriage 22 which embraces the bar 16 is of considerable width so as to provide wide bearing surfaces against the bar 16 in order to give the head stability; but that portion carrying said embossing head is reduced materially in width to provide an extension 28 so that said head or said extension may be so dimensioned as to mask only one selected group of character-forming projections 21 and not extend over adjacent groups of character-forming projections 21 (or the embossed impressions produced thereby on the paper P) when the embossing head is positioned on the bar 16 to overlie in cooperative relation with any one selected group of the character-embossing projections 21.

The groups of embossing projections 21 are arranged on the base plate 15 in the customary manner for producing Braille characters and symbols, as more particularly shown in Figs. 1 and 2 of the drawings, there being six of these projections in each group. Each group comprises two parallel spaced vertical rows with three projections in each row. It will also be noted that the space between adjacent groups of projections is greater than the space between the rows of projections within a group. This precise grouping of projections conforms to the pattern known conventionally in Braille writing as a "cell."

The preferred construction for the embossing head H, as at present devised, comprises the employment of the free end portion of said tongue-like extension 28 (see Figs. 4 and 5) as a supporting frame for six plunger elements 30 each slidably mounted in a guide opening 29, and having its axis normal to the underlying base plate 15, and said plungers 30 and their guide openings 29 being arranged in two spaced rows extending longitudinally of the extension 28 with three plungers 30 in each row to form what may be termed, for brevity of description in the appended claims, a "movable cell" of embossing plungers corresponding in number, size and arrangement with the six embossing projections 21 of each group of such projections, as above defined, on the underlying base plate 15 so that each plunger 30 will align with one of said projections of each group, respectively. The lower end of each of the plunger elements 30, on its surfaces opposed to a projection 21, is recessed or concaved correspondingly to the shape of its opposing projection 26 to receive and accommodate the same, as indicated at c in Fig. 5. Obviously, when the embossing head H has been moved to proper cooperating position and arrested by the ball 24 engaging in an opening 23, as above explained, a Braille character or symbol S may be formed on the paper P by depressing the plungers 30 to cooperate with their opposing embossing projections 21. It will be observed, also, that the head H is chambered, as at 31, which may be accomplished by the provision of a slot 31a extending transversely through the head H in a plane parallel with the base plate 15, and the opposite surfaces of the plungers, normally lying within the chamber 31 when in raised position (Figs. 4 and 5), are cut-away to produce shoulders 32 and 33. Disposed in said chamber 31, and extending between said rows of plungers 30 and between and in abutting alignment with said shoulders 32 and 33 thereof, is a bar 34 having its ends supported by compression springs 35 disposed in recessed portions of said chamber 31. Thus, the bar 34 is normally urged upwardly by means of compression springs 35 whereby the lower end of the plungers 30 are normally maintained out of contact with the sheet of paper P and preferably wholly within the confines of the head H. The distance between the shoulders 32 and 33 is such that upon depressing one plunger the bar 34 will not contact the shoulders 33 of any other of said plungers and thereby force it into engagement with its cooperating embossing projection 21. The portion of the head H containing the bar 34 and springs 35 may be formed of a separable section 36 defined by the line 37 (Figs. 1 and 4) and held in position by screws 38 so that the head may be easily assembled or disassembled for cleaning, repair or replacement of parts. The underside of the head H is provided with a lobe 39 to press the paper sheet P onto the crest of the embossing projection 21 so that the paper lies flat while being embossed.

In the formation of Braille symbols, the blind are quite accustomed to the use of a hand implement or stylus on Fig. 1, the numeral 40 designates such a stylus having a pointed shank 41 insertable into an elongated slot in a plate 42, the slot having scalloped opposite side edges 43. Consequently, such a plate is superposed upon the top surfaces of the head H so that its said slot will embrace the area of the upper ends of the plungers 30 and the scallops on its opposite edges will define notches outlining openings directly over the said upper ends of said plungers, respectively. Thus, in the use of the present invention, the blind person may employ the usual stylus 40 to engage and depress the upper end of any desired plunger 30 into contact with the paper and an embossing projection 21, the selection of which plunger 30 being aided and facilitated by the notched or scalloped edges 43, as is already common practice in guiding a stylus into alignment with a desired embossing indentation in the base plate of the usual Braille writing device.

It will be seen that the embossing head H on the carriage 22 provides a very compact rectangular formation dimensioned so that it will overlie the six embossing projections 26 of each character-forming group of the Braille system, the projections of each group being arranged to form the outline of a rectangle and spaced from each other in the usual manner; yet, the embossing head, because of its dimensions, will not overlap or overlie, but will fall short of, the area occupied by adjacent groups of similar projections 26 with a convenient marginal space therebetween. By reason of this design and construction of the embossing head, any symbol S, which has been formed on the paper P by depressing one or more of the plungers 30, through use of the stylus 40, will be uncovered as the embossing head H is moved to the right the required one space to form the next Braille symbol or character, thus enabling the user to read each Braille symbol immediately after it is formed.

It is thought that the use of operation of the device is readily apparent, when considering the above description with the accompanying drawings. The sheet of paper P is initially positioned in the holder-guide 10, in the manner previously described, and then inserted into the writing device W, as shown in Fig. 1. In this position, the carriage 22 overlies the paper P and the base plate 15 carrying the embossing projections 21 underlies said sheet of paper. The paper holding guide 10 and the carriage 22 are then adjusted relative to the place the writing is to begin on the paper P. The user takes the stylus 40 in hand and inserts its pointed end 41 into the slot in the plate 42 and with the aid of the scallops 43 selects the plunger 30 to be depressed, and, when so depressed, the latter cooperates with an embossing projection 21, to form a single embossed dot on the paper P which is one of the Braille characters or symbols. Repeating this operation with other selected plungers 30, while the head H is in the same position, will produce another Braille symbol. The user then moves the embossing head H one space to the right which is determined by the spring-pressed ball 24 moving into and out of engagement with the openings 23. This movement of the embossing head will uncover the symbol just formed so that the user can readily determine whether or not the proper symbol has been formed.

When the embossing head H has been moved to the extreme right-hand side of the paper P, or when it is otherwise desired to effect line spacing, the end 41 of the stylus 40 is inserted in the desired hole 14 of the paper holding guide 10 which is moved thereby upwardly (or downwardly, as the case may be) in the guide-way 20 until the stylus is stopped by the adjacent edge of the plate 15, at which time the spring-pressed ball 26 engages an opening 14 therein, thus resulting in the desired line spacing. It will be understood, of course, that the holes 14 are properly spaced on the paper holder-guide 10 in relation to the edges of the base plate 15 and the detent ball 26, as shown, to accomplish said proper line spacing. After moving the embossing head from its extreme right-hand position to the extreme left-hand position, the device is ready for writing another line. For other writings—for instance, mathematics—the head may proceed with equal facility from right-to-left or from left-to-right or up-and-down (relative to the paper sheet P), as when the holder-guide 10 is adjusted, and at all times—except when moved up with respect to the paper which rarely, if ever, occurs—exposes the symbols last formed.

By reason of the spacing of the holes 14 in the holder-guide 10 and the openings 23 in the bar 16, the present device enables, for the first time (so far as is known), the blind writer or user thereof to repeatedly remove the sheet P from the device and reinsert it thereinto and re-align it relative to the head H and/or the head relative to it so that a previously formed symbol S on the obverse side of the sheet P can be located by touch, while in the device, and changed or corrected by the head H and/or the writing resumed from that point on or from some other selected point in the progressive writing or at some other properly selected point on the sheet P.

Without further description it is believed that the features of the invention will be clearly understood and its advantages appreciated. It is desired to point out, however, that while only certain specific structures have been illustrated and described, these may be modified in various different respects within the spirit and scope of the invention as defined in the appended claims.

What I claim as new is:

1. A writing device for the blind adapted to produce embossed Braille characters on the obverse side of a paper sheet and comprising a base having a row of spaced conventional Braille cells of embossing projections in fixed position on its upper surface, a slidable embossing head mounted above the base plate and positioned to accommodate a paper sheet therebetween, a cell of independently movable embossing elements mounted in the embossing head to co-operatively mate with the embossing projections, respectively, of any single selected fixed cell on the base plate, the cell covering area of the embossing head being substantially the same as the area defined by one of said Braille cells on said base plate and adapted to overlie and mask completely on a single cell on said base plate at any one time and, when completely masking a cell on said base plate, to leave all other cells on said base plate uncovered and freely accessible to being touched by a person's finger, and means for guiding the embossing head in its movement along a row of said fixed cells.

2. A writing device for the blind adapted to produce embossed Braille characters on the obverse side of a paper sheet and comprising a base having a row of spaced conventional Braille cells of embossing propections in fixed position on its upper surface, a slidable embossing head mounted above the base plate and positioned to accommodate a paper sheet therebetween, a cell of complemental independently depressible embossing elements mounted in the embossing head for co-operatively mating with the embossing projections, respectively, of any single selected fixed cell on the base plate, the cell covering area of the embossing head being substantially the same as the area defined by one of said Braille cells on said base plate and adapted to overlie and mask completely on a single cell on said base plate at any one time and, when completely masking a cell on said base plate, to leave all other cells on said base plate uncovered and freely accessible to being touched by a person's finger, means for guiding the embossing head in its movement along a row of said fixed cells, and means for yieldingly arresting the movement of said embossing head upon arrival in co-operative position directly over each fixed cell on said base.

3. A writing device for the blind adapted to produce embossed Braille characters on the obverse side of a paper sheet and comprising a base plate having a row of spaced conventional Braille cells of embossing projections in fixed position on its upper surface, a slidable embossing head mounted above the base plate to accommodate a paper sheet therebetween, a cell of independently depressible plungers mounted in the embossing head for cooperation with the embossing projections, respectively, of any single selected fixed cell on the base plate and each having a complemental lower surface to mate with corresponding embossing projections of the selected fixed cell, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger, means for guiding the embossing head in its movement along a row of fixed cells, and a paper-holding member slidably mounted on the base plate for movement at right angles to the row of fixed cells on said base, and means for guiding the paper-holding member in step-by-step line-spacing movement.

4. A writing device for the blind adapted to produce embossed Braille characters on the obverse side of a paper sheet and comprising a base plate having a row of spaced conventional Braille cells of embossing projections in fixed position on its upper surface, a movable embossing head mounted above the base plate to accommodate a paper sheet therebetween, a movable cell of independently depressible embossing mating elements mounted in the embossing head to cooperatively mate with the embossing projections, respectively, of any single selected fixed cell on the base plate, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger, a paper-holding member slidably mounted on the base plate relative to a row of fixed cells, and means for arresting the paper-holding member in regularly spaced positions for appropriate spacing of lines of Braille characters embossed on the paper sheet.

5. A writing device for the blind adapted to produce embossed Braille characters on the obverse side of a paper sheet and comprising a base plate having a row of spaced conventional Braille cells of embossing projections in fixed position on its upper surface, a slidable embossing head mounted above the base plate to accommodate a paper sheet therebetween, a movable cell of independently depressible embossing elements mounted in the embossing head for cooperation with embossing projections of any single selected fixed cell on the base plate, each of said elements having a complemental lower surface for mating with corresponding embossing projections, respectively, of the selected fixed cell, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger, means for guiding the embossing head in its movement along a row of fixed cells, means for yieldably arresting the movement of said embossing head upon arrival in operative position directly over each fixed cell, a paper-holding member slidably mounted on the base plate for movement at right angles to the row of fixed cells, means for guiding the paper-holding member in step-by-step line-spacing movement, and means for arresting the paper-holding member in regularly spaced positions for appropriate spacing of lines of Braille characters embossed on the paper sheet.

6. A writing device for the blind adapted to produce embossed Braille characters on the obverse side of a paper sheet and comprising a narrow elongated base plate having a lengthwise row of spaced conventional cells of fixed embossing projections arranged along one side edge of its upper surface, a supporting bar mounted above the base plate and extending lengthwise along the edge opposite to that nearer the row of embossing projections, a carriage mounted for longitudinal sliding movement on the bar, and a narrow embossing head projecting laterally from the carriage to overlie the row of embossing projections, and a movable cell of parallel plunger elements mounted in the embossing head for independent depression and having cupped lower surfaces for engagement with corresponding embossing projections, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger.

7. A writing device for the blind adapted to produce embossed Braille characters on the obverse side of a paper sheet and comprising a narrow elongated base plate having a lengthwise row of spaced conventional cells of fixed embossing projections arranged along one side edge of its upper surface, a supporting bar mounted above the base plate and extending lengthwise along the edge opposite to that nearer the row of embossing projections, a carriage mounted for longitudinal sliding movement on the bar, and a narrow embossing head projecting laterally from the carriage to overlie the row of embossing projections, a movable cell of parallel plunger elements mounted in the embossing head for independent depression and having cupped lower surfaces for engagement with corresponding embossing projections, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger, a guide member on the base plate having a guiding slot extending at right angles to the row of embossing projection cells and being located at one end of the base plate, and an elongated paper-holder adapted to engage one edge of a paper sheet and to fit removably in the guide slot for sliding movement to afford line-spacing adjustment.

8. In a writing device for the blind adapted to produce embossed Braille characters on the obverse side of a paper sheet and comprising a base plate having a row of spaced conventional Braille cells of fixed embossing projections on its upper surface, a carriage supporting bar mounted above the base plate parallel to the row of cells of embossing projections and offset laterally therefrom, a carriage slidable longitudinally on the supporting bar, a narrow extension projecting laterally from the carriage to overlie the row of cells of embossing projections and an embossing head provided on the carriage extension and a movable cell of plunger elements mounted for independent vertical depression in the embossing head, each plunger element having a cupped lower surface for operative engagement with the corresponding embossing projection of a cell in registration with the head, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger.

9. In a writing device for the blind adapted to produce embossed Braille characters on the obverse side of a paper sheet comprising a base plate having a row of spaced conventional Braille cells of fixed embossing projections on its upper surface, a carriage supporting bar mounted above the base plate parallel to the row of cells of embossing projections and offset laterally therefrom, a carriage slidable longitudinally on the supporting bar, a narrow extension projecting laterally from the carriage to overlie the row of cells of embossing projections, and an embossing head provided on the carriage extension, a movable cell of plunger elements mounted for independent vertical depression in the embossing head, each plunger element having a cupped lower surface for operative engagement with the corresponding embossing projection of a cell in registration with the head, the cell covering area of the embossing head being substantially the same as the area defined by one of said Braille cells on said base and adapted to overlie and mask completely only a single cell on said base at any one time and, when completely masking a cell, to leave all other cells uncovered and freely accessible to being touched by a person's finger, and means for arresting the carriage in each position wherein the embossing head is in exact vertical registration with any selected cell of embossing projections.

PAUL W. HOFF.

REFERENCES CITED

The following references are of record in the file of this patent:

UNITED STATES PATENTS

| Number | Name | Date |
|---|---|---|
| 121,026 | Briesen | Nov. 14, 1871 |
| 389,756 | McElroy | Sept. 18, 1888 |
| 642,139 | Littlewood | Jan. 30, 1900 |
| 910,330 | Wait | Jan. 19, 1909 |
| 1,019,789 | Heiskell | Mar. 12, 1912 |
| 1,203,252 | O'Reilly | Oct. 31, 1916 |
| 1,284,118 | McDonald | Nov. 5, 1918 |
| 1,293,023 | Bryan | Feb. 4, 1919 |
| 1,768,753 | Fensky | July 1, 1930 |
| 1,884,639 | Fensky | Oct. 25, 1932 |
| 1,994,046 | Newbaker | Mar. 12, 1935 |

FOREIGN PATENTS

| Number | Country | Date |
|---|---|---|
| 568,757 | France | Apr. 1, 1924 |
| 177,292 | Great Britain | Mar. 30, 1922 |
| 464,357 | Great Britain | Apr. 16, 1937 |